United States Patent
Uehara et al.

(10) Patent No.: US 11,200,479 B2
(45) Date of Patent: Dec. 14, 2021

(54) ELECTROMAGNETIC-COUPLING DUAL IC CARD AND IC MODULE

(71) Applicant: TOPPAN PRINTING CO., LTD., Tokyo (JP)

(72) Inventors: Eriko Uehara, Tokyo (JP); Tetsuya Tsukada, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/406,875

(22) Filed: May 8, 2019

(65) Prior Publication Data

US 2019/0266469 A1 Aug. 29, 2019

Related U.S. Application Data

(63) Continuation of application No. PCT/JP2017/041550, filed on Nov. 17, 2017.

(30) Foreign Application Priority Data

Nov. 18, 2016 (JP) .............................. JP2016-224863

(51) Int. Cl.
*G06K 19/06* (2006.01)
*G06K 19/077* (2006.01)
(Continued)

(52) U.S. Cl.
CPC ..... *G06K 19/07783* (2013.01); *B42D 25/305* (2014.10); *G06K 19/077* (2013.01);
(Continued)

(58) Field of Classification Search
CPC ....... G06K 19/07794; G06K 19/07722; G06K 19/07769; G06K 19/07728;
(Continued)

(56) References Cited

U.S. PATENT DOCUMENTS

2012/0018522 A1 1/2012 Le Garrec et al.
2014/0104133 A1* 4/2014 Finn ..................... H01Q 1/2283
343/866
(Continued)

FOREIGN PATENT DOCUMENTS

FR 2998395 A1 * 5/2014 ....... G06K 19/07769
JP 2004-287472 A 10/2004
(Continued)

OTHER PUBLICATIONS

International Searching Authority, "International Search Report," issued in connection with International Patent Application No. PCT/JP2017/041550, dated Dec. 12, 2017.
(Continued)

*Primary Examiner* — Thien T Mai
(74) *Attorney, Agent, or Firm* — Foley & Lardner LLP

(57) ABSTRACT

An electromagnetic-coupling dual IC card includes an IC module and a plate-like card body. The IC module includes a module substrate having a first surface and a second surface, contact terminals provided on the first surface of the module substrate to be contactable with an external contact-type device, an IC chip having a contact communication function and a contactless communication function and disposed on the second surface, and a first connecting coil provided on the first surface. The plate-like card body includes an antenna sheet embedded therein and has a recess for holding the IC module, the antenna sheet being provided with a coupling coil to be electromagnetically coupled to the first connecting coil, and a main coil connected to the coupling coil to perform contactless communication with an external contactless-type device. The first connecting coil does not overlap with the contact terminals in plan view.

5 Claims, 5 Drawing Sheets

(51) Int. Cl.
*B42D 25/305* (2014.01)
*H04B 5/02* (2006.01)
*H01Q 7/00* (2006.01)

(52) U.S. Cl.
CPC ... *G06K 19/0775* (2013.01); *G06K 19/07747* (2013.01); *H04B 5/02* (2013.01); *H01Q 7/00* (2013.01)

(58) Field of Classification Search
CPC ....... G06K 19/07754; G06K 19/07745; G06K 19/07747; G06K 19/07749; G06K 19/07758; G06K 19/07783; G06K 19/04; G06K 19/041; G06K 19/072; G06K 19/0723; G06K 19/07309; G06K 19/077; G06K 19/07705; G06K 19/07743; G06K 19/0775; G06K 19/07756; G06K 19/07775; G06K 19/07792; G06K 9/00885; G06K 19/07773; G06K 19/07779; G06K 19/0715; G06K 19/0718; G06K 1/125; G06K 13/0868; G06K 17/0029; G06K 19/07354; G06K 19/07732; G06K 19/07739; G06K 7/0021; G06K 7/084; G06K 7/10128; G06K 7/10178; G06K 7/10415; G06K 13/08; G06K 19/07; G06K 19/07718; G06K 19/07784; G06K 19/08; G06K 19/10; G06K 7/082; G06K 7/083; G06K 7/10346; G06K 19/067; G06K 19/0726; G06K 19/07733; G06K 19/07741; G06K 19/07771; G06K 7/10336; H01Q 7/00; H01Q 1/2225; H01Q 1/38; H01Q 21/0025; B42D 25/305; H04B 5/02; H04B 1/40; H04B 5/0012; H04B 5/0062; H04B 5/0081
See application file for complete search history.

(56) References Cited

U.S. PATENT DOCUMENTS

2015/0136858 A1    5/2015  Finn et al.
2016/0104064 A1*   4/2016  Mizoguchi ....... G06K 19/07779
                                                257/531

FOREIGN PATENT DOCUMENTS

| JP | 2004287472 A | * | 10/2004 | .......... G06K 19/077 |
| JP | 2014-529927 A | | 11/2014 | |
| JP | 2016-118847 A | | 6/2016 | |
| JP | 6451298 B2 | * | 1/2019 | |
| WO | WO-96/35190 A1 | | 11/1996 | |
| WO | WO-99/26195 A1 | | 5/1999 | |
| WO | WO-2008/142247 A | | 11/2008 | |
| WO | WO-2014208437 A1 | * | 12/2014 | ....... G06K 19/07794 |

OTHER PUBLICATIONS

International Searching Authority, "Written Opinion," issued in connection with International Patent Application No. PCT/JP2017/041550, dated Dec. 12, 2017.
Extended European Search Report dated Oct. 31, 2019 for corresponding Application No. 17871967.0 (9 pages).

* cited by examiner

US 11,200,479 B2

ELECTROMAGNETIC-COUPLING DUAL IC CARD AND IC MODULE

CROSS-REFERENCE TO RELATED PATENT APPLICATIONS

This application is a Bypass Continuation of International Patent Application No. PCT/JP2017/041550, filed on Nov. 17, 2017, which is based upon and claims the benefit of priority of Japanese Patent Application No. 2016-224863, filed on Nov. 18, 2016, the entire contents of all of these are hereby incorporated by reference in their entireties.

TECHNICAL FIELD

The present invention relates to a dual IC card having both a contact communication function and a contactless communication function, and an IC module, and in particular, relates to an electromagnetic-coupling dual IC card in which an antenna sheet having an antenna coil for performing contactless communication can be electromagnetically coupled, via a coupling coil, to an IC module for performing both of the communication functions, and an IC module used for the electromagnetic-coupling dual IC card.

BACKGROUND ART

Dual IC cards having a contact communication function and a contactless communication function have communication modes that can be used according to desired applications. Thus, dual IC cards have been used for various applications. Dual IC cards used in recent years are capable of performing with a power supply and establishing communication through electromagnetic coupling between an antenna coil of an IC module joined to the card body by an insulating adhesive or the like, and an antenna coil embedded in the card body. Such electromagnetic-coupling dual IC cards can reduce or prevent unstable electrical connection between the IC module and the card body. In this regard, if the IC module and the card body are directly connected via an electrically conductive connecting member, such as solder, the connecting member may be broken when the dual IC card is bent, or when the connecting member has deteriorated with age.

As such electromagnetic-coupling dual IC cards are capable of electrically connecting an IC module to the card body through electromagnetic coupling, there are known, for example, the IC cards as described in PTLs 1 and 2.

FIG. 9 is a cross-sectional view illustrating an example of an electromagnetic-coupling dual IC card based on the conventional art. The IC module 40 includes contact terminals 45 which are formed on the front surface of a substrate 43 (front surface of the card) to serve as a contact interface for an external device for contact communication. The IC module 40 also includes an IC chip 44 mounted to the back surface of the substrate 43, and a connecting coil 41 that is formed around the IC chip 44 to provide transformer coupling (electromagnetic coupling).

The card body 50 includes an antenna substrate 42 that is a sheet-like resin substrate having a first surface provided with a coupling coil 48 and an antenna coil (main coil) 49 both of which are formed by printing and resin-sealed. The coupling coil 48 is looped around the outside of the IC chip 44 of the IC module 40 in plan view to surround the IC chip 44. Between the antenna coil 49 and the coupling coil 48, a capacitor 46 is serially connected. The capacitor 46 has an electrode, which is on a first surface of the antenna substrate 42, connected to an end of the antenna coil 49, and another electrode, which is on the other surface, connected to an end of the coupling coil 48 via a through hole (not shown) provided to the antenna substrate 42.

The coupling coil 48 of the card body 50 is transformer-coupled with the connecting coil 41 of the IC module 40 to enable power supply and communication between the antenna coil 49 and an external device for contactless communication, such as a reader/writer.

In an application that needs reliability and security, such as an application exchanging massive amounts of data or making communication for account settlement information with a credit card, contact communication is generally used. In an application using a smaller amount of data, such as an application of controlling a gate for entry and exit where the main communication is authentication, contactless communication is generally used.

CITATION LIST

[Patent Literature] [PTL 1] WO 99/26195; [PTL 2] WO 96/35190

SUMMARY OF THE INVENTION

The IC modules of the electromagnetic-coupling dual IC cards as mentioned above may impair communication properties due to reaction magnetic flux or the like caused by eddy current which is generated by interaction of the connecting coil with the contact terminals.

Furthermore, in the electromagnetic-coupling dual IC cards as mentioned above, the number of turns of the connecting coil of the IC module and the number of turns of the coupling coil of the card body are adjusted to achieve impedance matching and optimize power supply to the IC chip and communication properties. However, the location of the coupling coil in the card body is limited because the location of the IC module relative to the card body is prescribed by a standard (JIS X6320-2: 2009 (ISO/IEC 7816: 2007)) or the card body needs to be provided with an embossing area (e.g., JIS X6302-1: 2005 (ISO/IEC 7811-1: 2002)) enabling embossing. Therefore, it is not always easy to achieve impedance matching by adjusting the location of the coupling coil.

In addition, IC chips to be mounted to IC modules are produced based on various specifications, depending on the size or input capacity required of the IC chips. Therefore, it is necessary to adjust the number of turns or the location of the connecting coil of the IC module in conformity with the required size or input capacity. However, the electromagnetic-coupling dual IC cards as mentioned above have an area limitation in the surface where the IC chip is mounted. Therefore, it is not always easy to adjust the number of turns or the location of the connecting coil.

The present invention has been made in light of the issues set forth above, and has an object of providing an electromagnetic-coupling dual IC card that can reduce or prevent degradation of communication properties due to reaction magnetic flux or the like caused by eddy current which is generated by interaction of the connecting coil with the contact terminals.

Moreover, the present invention has an object of providing an electromagnetic-coupling dual IC card that can raise the degree of freedom in the location or the number of turns of the connecting coil of the IC module to raise the degree of freedom in achieving impedance matching on the IC module side, and can easily optimize power supply and communication properties.

Moreover, the present invention has an object of providing an electromagnetic-coupling dual IC card that can miniaturize the IC module and can be produced at low cost.

[Attempted Improvement or Solution to Problem]

An electromagnetic-coupling dual IC card according to an aspect of the present invention includes an IC module and a plate-like card body. The IC module includes a module substrate having a first surface and a second surface, contact terminals provided on the first surface of the module substrate so as to be contactable with an external contact-type device, an IC chip having a contact communication function and a contactless communication function and disposed on the second surface of the module substrate, and a first connecting coil provided on the first surface of the module substrate. The plate-like card body includes an antenna sheet which is embedded therein and has a recess for holding the IC module, the antenna sheet being provided with an antenna having a coupling coil to be electromagnetically coupled to the first connecting coil, and a main coil connected to the coupling coil to perform contactless communication with an external contactless-type device. In this IC card, the first connecting coil is disposed so as not to overlap with the contact terminals in plan view.

The IC module may further include a second connecting coil provided on the second surface of the module substrate.

The second connecting coil may be disposed so as not to overlap with the contact terminals in plan view.

The first connecting coil provided to the first surface may be formed, surrounding the contact terminals in plan view.

The first connecting coil provided to the first surface may be surrounded by the contact terminals in plan view.

The first connecting coil provided to the first surface may be formed, surrounding part of the contact terminals in plan view.

The first connecting coil provided to the first surface may be sealed with a resin.

An IC module according to an aspect of the present invention includes: a module substrate having a first surface and a second surface; contact terminals provided on the first surface of the module substrate so as to be contactable with an external contact-type device; an IC chip having a contact communication function and a contactless communication function and disposed on the second surface of the module substrate; and a first connecting coil provided on the first surface of the module substrate. In the IC module, the first connecting coil is disposed so as not to overlap with the contact terminals in plan view.

[Desired Advantageous Effects of the Invention]

According to some of the aspects described above, there can be provided an electromagnetic-coupling dual IC card that can reduce or prevent degradation of communication properties due to reaction magnetic flux or the like caused by eddy current which is generated by interaction of the connecting coil with the contact terminals.

According to some of the aspects described above, there can be provided an electromagnetic-coupling dual IC card that can raise the degree of freedom in the number of turns or the location of the connecting coil of the IC module, and can achieve good impedance matching in conformity with the size and performance of the IC chip.

According to some of the aspects described above, the IC module can be miniaturized, and thus there can be provided an electromagnetic-coupling dual IC card that can be produced at low cost, and can raise the degree of freedom in the design of the ticket surface.

According to some of the aspects described above, there can be provided an electromagnetic-coupling dual IC card of higher durability that can prevent breakage of the coil provided to the front surface of the card.

DESCRIPTION OF THE REPRESENTATIVE EMBODIMENTS

Figure 1:
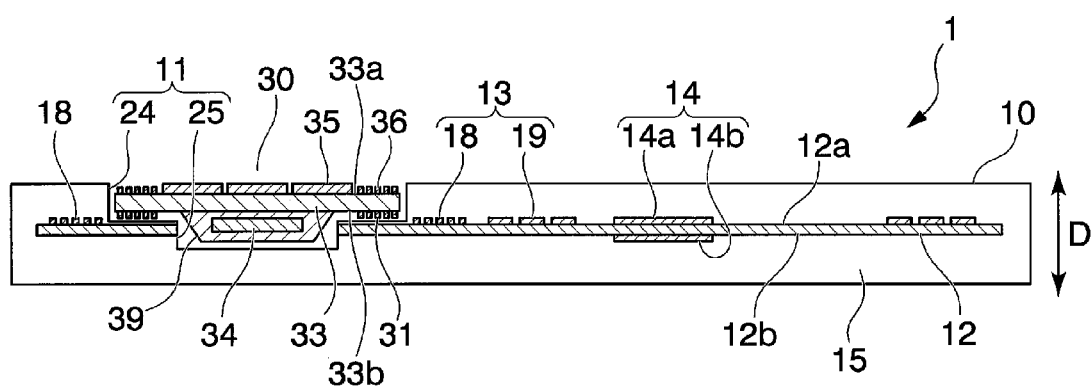
FIG. 1 is a schematic cross-sectional view illustrating an electromagnetic-coupling dual IC card, according to an embodiment of the present invention.

With reference to FIGS. 1 to 4, an electromagnetic-coupling dual IC card according to an embodiment of the present invention will be described. The preferred embodiments of the present invention will now be described in detail with reference to the drawings. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale.

Figure 2:
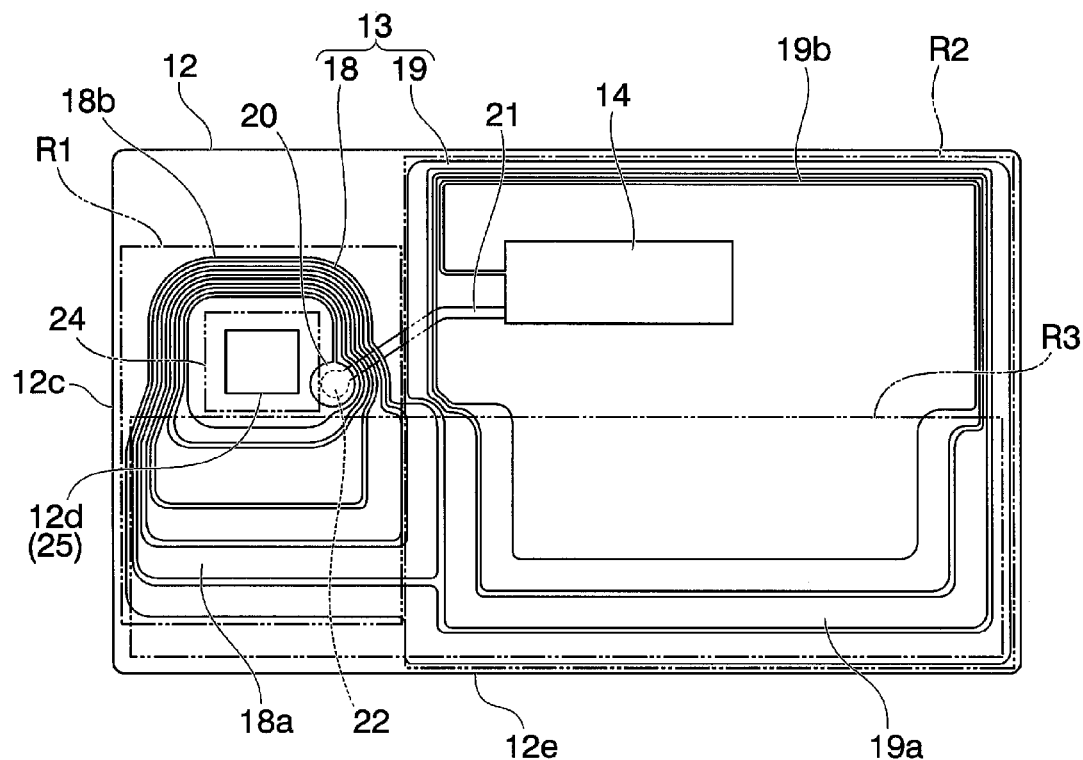
FIG. 2 is a plan view illustrating an antenna that presents an electromagnetic-coupling dual IC card, according to an embodiment of the present invention.

FIGS. 1 and 2 show an electromagnetic-coupling dual IC card 1 (may also be simply termed IC card 1 hereinafter) according to the present embodiment which includes a plate-like card body 10 provided with a recess 11, and an IC module 30 held in the recess 11.

FIG. 1 is a schematic cross-sectional view illustrating the dual IC card 1. In the figure, the number of turns of an antenna 13, described later, is shown in simplified form. FIG. 2 shows a contour of an antenna sheet 12 incorporated in the card body 10, and an example of an arrangement of the antenna 13 and a capacitor 14, which are provided to the antenna sheet 12.

The card body 10 includes the antenna sheet 12 having the antenna 13, the capacitors 14 electrically connected to the antenna 13, and a card substrate 15 sealing the antenna sheet 12, the antenna 13, and the capacitor 14.

In the example shown in FIG. 2, the antenna sheet 12 is formed into a rectangular shape in plan view. As materials for the antenna sheet 12, for example, PET (polyethylene terephthalate), polyethylene naphthalate (PEN), and the like, having insulation properties may be mentioned.

The antenna sheet 12 has a short side 12c near which a holding hole 12d is formed, passing through the antenna sheet 12 in a thickness direction D thereof. The holding hole 12d is formed into a rectangular shape, in plan view, with its sides being parallel to short or long sides of the antenna sheet 12. The antenna sheet 12 has a thickness, for example, in the range of 15 μm to 50 μm.

The antenna 13 has a coupling coil 18 electromagnetically coupled to a second connecting coil 31 and a first connecting coil 36 of the IC module 30, described later, and a main coil 19 connected to the coupling coil 18 to perform contactless communication with an external contactless-type device (not shown), such as a reader/writer. In the example shown in FIG. 2, the coupling coil 18 is disposed in an area R1, and the main coil 19 is disposed in an area R2 adjacent to the area R1.

At a position between the holding hole 12 and a long side 12e of the antenna sheet 12, there is provided an embossing area R3 enabling embossing based on IC card standard (X 6302-1: 2005 (ISO/IEC 7811-1: 2002)).

Figure 3:
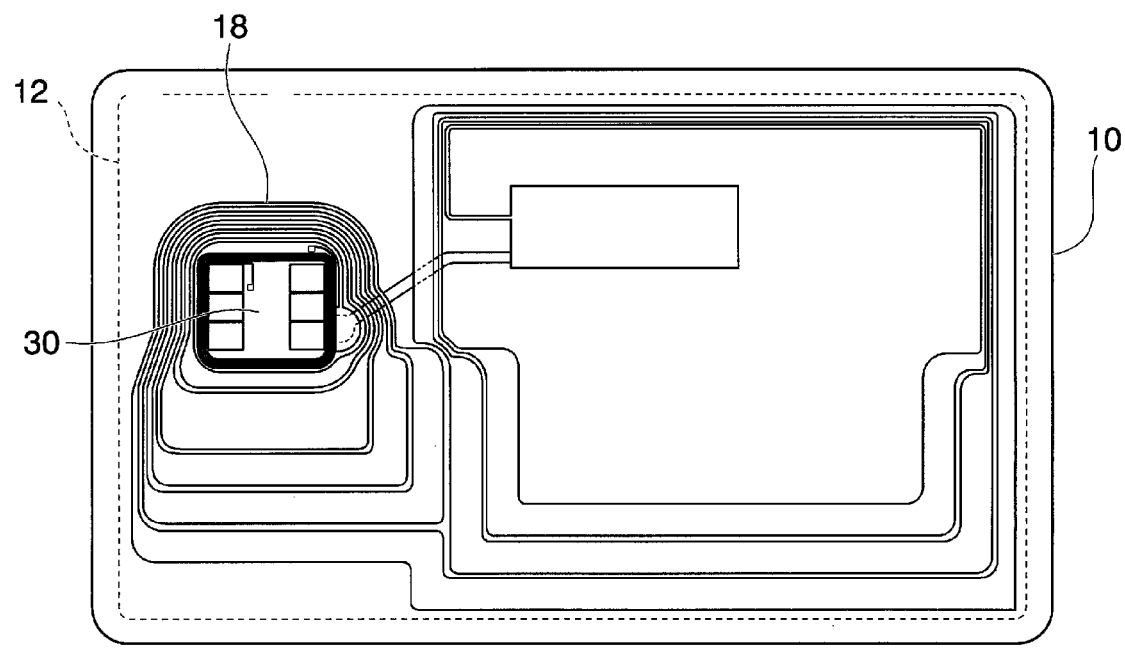
FIG. 3 is a plan view illustrating an electromagnetic-coupling dual IC card, according to an embodiment of the present invention.

In the example shown in FIGS. 2 and 3, the coupling coil 18 is spirally formed on a first surface 12a of the antenna sheet 12, where the recess 11 is open. More specifically, the coupling coil 18 with five turns is provided around the IC module 30 (recess 11) in plan view (i.e. as viewed from above the IC card 1 along a line normal to the front surface thereof). The coupling coil 18 in the embossing area R3 is configured by an element wire 18a, while the coupling coil 18 on the outside of the embossing area R3 is configured by an element wire 18b. The element wire 18a has a width larger than that of the element wire 18b. The element wire 18b has an innermost end provided with a substantially circular terminal 20 having a width larger than that of the element wire 18b. The terminal 20 is formed on the first surface 12a.

A substantially circular terminal 22 is provided, overlapping with the terminal 20 of the coupling coil 18 in the thickness direction D. The terminal 22 is connected to the capacitor 14 via a connecting wire 21. The terminal 20 of the coupling coil 18 is electrically connected to the terminal 22 of the connecting wire 21 by using known crimping processing or the like. The capacitor 14 is serially connected between the coupling coil 18 and the main coil 19.

As shown in FIG. 2, the main coil 19 is formed in the area R2, being spirally looped three times. The main coil in the embossing area R3 is configured by an element wire 19a, while the main coil 19 on the outside of the embossing area R3 is configured by an element wire 19b. The element wire 19a has a width larger than that of the element wire 19b. By increasing the width of the element wire 19a and the width of the element wire 18a, the element wires 19a and 18a can be prevented from being disconnected when the embossing area R3 is embossed.

The element wire 19a of the main coil 19 has an outermost end connected to the outermost end of the element wire 18a of the coupling coil 18.

The element wires 19b and 18b each have a width, for example, in the range of about 0.1 mm to 1 mm. By arranging each of the element wires 19b and 18b at an interval in the range of about 0.1 mm to 1 mm between turns, the coupling coil 18 and the main coil 19 in the areas other than the area R3 can be formed. However, the width and the arrangement interval of the element wires 19b and 18b are not limited to these values. The element wires 19a and 18b each have a width, for example, in the range of about 1 mm to 15 mm. By arranging each of the element wires 19a and 18a at an interval in the range of about 0.1 mm to 1 mm between turns, the coupling coil 18 and the main coil 19 in the embossing area R3 can be formed. However, the width and the arrangement interval of the element wires 19a and 18a are not limited to these values.

As shown in FIGS. 1 and 2, the capacitor 14 has an electrode plate 14a provided on the first surface 12a of the antenna sheet 12, and an electrode plate 14b provided on a second surface 12b of the antenna sheet 12. The electrode plates 14a and 14b are disposed face-to-face, sandwiching the antenna sheet 12.

The electrode plate 14a is connected to the innermost end of the element wire 19b of the main coil 19.

The electrode plate 14b is connected to the connecting wire 21 provided to the second surface 12b. As mentioned above, the connecting wire 21 is connected to the terminal 22.

The antenna 13, the capacitor 14, and the connecting wire 21 are formed, for example, by generally used gravure printing, i.e., by etching a copper foil or an aluminum foil to which a resist is applied.

As can be seen from the example shown in FIG. 3, the card substrate 15 is formed into a rectangular shape in plan view. Examples of the material for the card substrate 15 include insulating materials, including polyester-based materials such as amorphous polyester, vinyl chloride-based materials such as PVC (polyvinyl chloride), polycarbonate-based materials, and PET-G (polyethylene terephthalate copolymer).

As shown in FIG. 1, the recess 11 is formed in the card substrate 15. The recess 11 has a first holder 24 that is open in the front surface of the card substrate 15, and a second holder 25 communicating with the first holder 24 and having a width smaller than that of the first holder 24.

It should be noted that the card body 10 may be formed by sandwiching a separately prepared antenna sheet 12, antenna 13, and capacitor 14 between a pair of films, and integrating the pair of films by lamination through hot pressing or by using an adhesive, followed by punching the integrated material into a card shape.

As shown in FIG. 1, the IC module 30 includes a sheet-like module substrate 33 having a second surface 33b and a first surface 33a, an IC chip 34 and a second connecting coil 31 which are provided to the second surface 33b of the module substrate 33, and a first connecting coil 36 and a plurality of contact terminals (contact terminals) 35 which are provided to the first surface 33a of the module substrate 33. The IC module 30 may further include a resin seal 39.

The module substrate 33 is formed into a rectangular shape in plan view. As the material for the module substrate 33, for example, glass epoxy, PET (polyethylene terephthalate), or the like may be mentioned. The module substrate 33 has a thickness, for example, in the range of 50 μm to 200 μm.

As the IC chip 34, a known IC chip having a contact communication function and a contactless communication function may be used.

The second connecting coil 31 is spirally formed on the second surface 33b of the module substrate 33 so as to surround the IC chip 34 and the resin seal 39. The first connecting coil 36 is spirally formed on the first surface 33a of the module substrate 33 so as to surround the plurality of contact terminals 35. The second connecting coil 31 is disposed so as not to overlap with the plurality of contact terminals 35 in plan view. The term "in plan view" refers to a view from above the IC module 33 along a line normal to the surface 33a (33b).

The first connecting coil 36 has end points 37 and 38 respectively provided with through holes 37c and 38c passing through the module substrate 33. These through holes 37c and 38c respectively include metal layers which are formed by a known plating technique, or other techniques. The end point 37, which is on the first surface 33a, is electrically connected to the second connecting coil 31 on the second surface 33b via the through hole 37c. The end point 38, which is also on the first surface 33a, is electrically connected to the IC chip 34 on the second surface 33b via the through hole 38c.

The first connecting coil 36 is disposed so as not to overlap with the plurality of contact terminals 35 in plan view. In the example shown in FIG. 1, the second and first connecting coils 31 and 36 are held in the first holder 24 of the recess 11, and disposed between the side wall of the first holder 24 and the side wall of the second holder 25.

The second and first connecting coils 31 and 36 are each formed, for example, by etching a copper foil or an aluminum foil. The second and first connecting coils 31 and 36 each have a thickness, for example, in the range of 5 µm to 50 µm. The first connecting coil 36 may be plated, with plating wires 60 being connected thereto.

The second and first connecting coils 31 and 36 configure contactless terminals which can be electromagnetically coupled to the coupling coil 18 of the card body 10.

The contact terminals 35 are formed, for example, by laminating a copper foil, which has a predetermined pattern, on the first surface 33a of the module substrate 33. Portions of the copper foil exposed externally may be provided with a nickel layer by plating, with a thickness in the range of 0.5 µm to 3 µm. The nickel film may further be provided thereon with a gold layer by plating, with a thickness in the range of 0.01 µm to 0.3 µm. The plurality of contact terminals 35, as C1 to C7, may be plated, with plating wires 60 being connected thereto. When the first connecting coil 36 surround the plurality of contact terminals 35, as C1 to C7, on the first surface 33a, the plating wires 60 may be provided on the second surface 33b and connected to the contact terminals 35 via respective plating through holes 60c.

The contact terminals 35 are used for communicating with an external contact-type device, such as an automatic teller machine. The contact terminals 35 are connected to an element or the like, not shown, incorporated in the IC chip 34.

It should be noted that non-electrolytic plating may be conducted instead of electrolytic plating that involves use of the plating wires 60. The same applies to the following description of plating.

The second connecting coil 31 has an end which is connected to the IC chip 34 through a wire, not shown, and has the other end which is connected, as mentioned above, to an end of the first connecting coil 36 via the through hole 37c. The other end of the first connecting coil 36 is connected to the IC chip 34 through a wire, not shown, via the through hole 38c. The IC chip 34, the second and first connecting coils 31 and 36, and the wires altogether configure a closed circuit.

Figure 4:
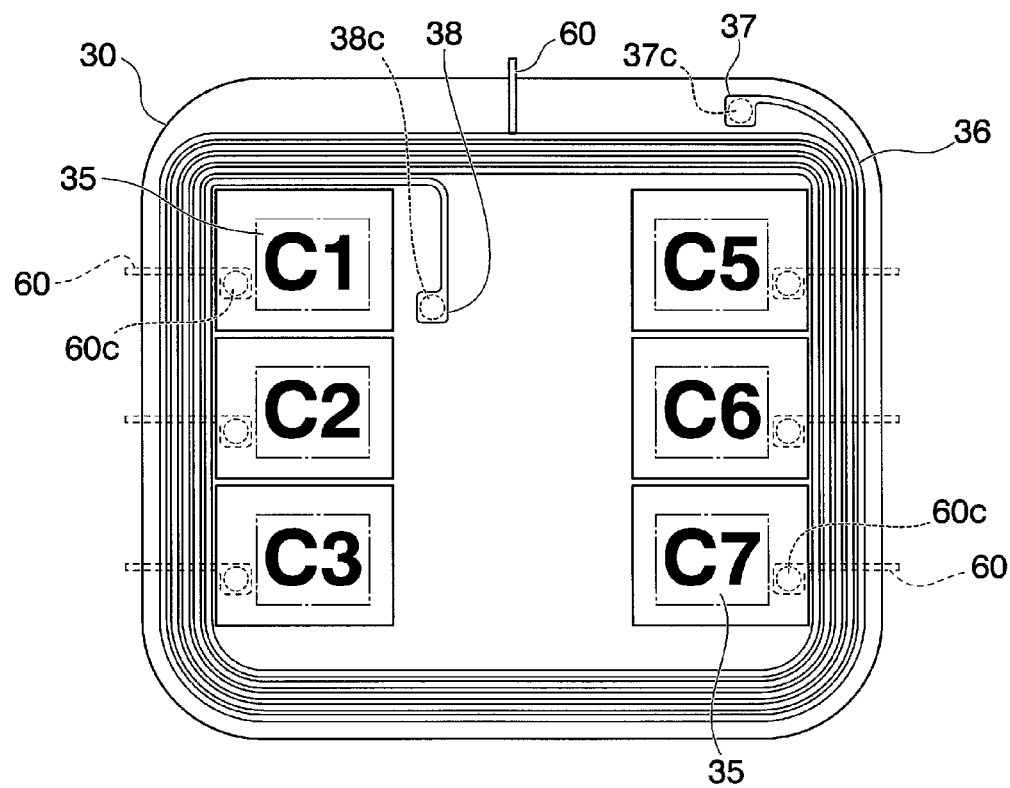
FIG. 4 is a plan view illustrating an IC module, according to an embodiment of the present invention.

Although the connecting coils 31 and 36 are respectively provided to the second and first surfaces 33b and 33a of the module substrate 33 in the example shown in FIG. 1, the second connecting coil 31 may be omitted, from the perspective of alleviating the influence of eddy current described later (see FIG. 4).

The resin seal 39 may be formed, for example, of a known epoxy resin or the like. With the resin seal 39 being provided to the IC module 30, the IC chip 34 can be protected, or wire disconnection can be prevented from occurring.

As described above, the electromagnetic-coupling dual IC card 1 is provided with the connecting coil 36 on the first surface 33a of the module substrate 33 so as not to overlap with the contact terminals 35 in plan view. Thus, communication properties are prevented from being degraded due to reaction magnetic flux or the like caused by eddy current which is generated by interaction of the connecting coil with the contact terminals. Accordingly, an electromagnetic-coupling dual IC card 1 having good communication properties can be obtained.

In this regard, an IC card having a connecting coil, which is provided overlapping with the contact terminals in plan view, allows increase of eddy current generated in the contact terminals which are formed of metal sheets. Increase of eddy current accelerates energy loss and generation of reaction magnetic flux, resultantly attenuating the signal-carrying magnetic flux used for communication. Consequently, adequate communication properties are not necessarily obtained.

When the module substrate 33 is provided with the second and first connecting coils 31 and 36 on the respective surfaces thereof, the number of turns of the coil on one surface of the module substrate 33 can be reduced to obtain an inductance which is equivalent to the inductance of a module substrate provided with a connecting coil on one surface thereof. Specifically, the space occupied by the connecting coils in the module substrate 33 in plan view can be reduced. In other words, there are fewer limitations in the arrangement or the number of turns of the connecting coils. Accordingly, impedance matching is easily achieved with the coupling coil 18 of the card body 10. With this configuration, IC chips having different impedance properties can be reliably dealt with. Even when a plurality of types of IC chips are used, communication properties or performance, such as power supply, can be easily optimized.

Taking an example of using one IC chip, the IC module, which is configured to include a module substrate with a connecting coil formed on only one surface, is required to have a size of about 11.8 mm×13.0 mm in order to accomplish communication properties that meet ISO standards or the like. In this regard, the IC module, which is configured to include a module substrate with connecting coils formed on both surfaces, only needs to have a size of about 8.32 mm×11.0 mm in order to accomplish communication properties that can meet such standards. In this way, the IC module 30 can be miniaturized, and the module substrate 33 can be produced at lower cost. Thus, a less expensive electromagnetic-coupling dual IC card can be provided.

In addition, miniaturization of the IC module 30 leads to increase in area for arranging motifs on the ticket surface of the IC card 1, and thus further leads to improving designability of the card.

The contact terminals 35 and the first connecting coil 36 formed on the first surface 33a of the module substrate 33 may be covered with a resin, such as epoxy, for protection.

In this case, the first connecting coil 36, which is formed on the same surface as are the contact terminals 35 of the IC module 30, is prevented from being broken due to wear caused by being brought into contact with the contact terminals of a contact-type reader/writer. Specifically, an electromagnetic-coupling dual IC card having higher durability can be obtained for use with a contact-type reader/writer.

Figure 5:
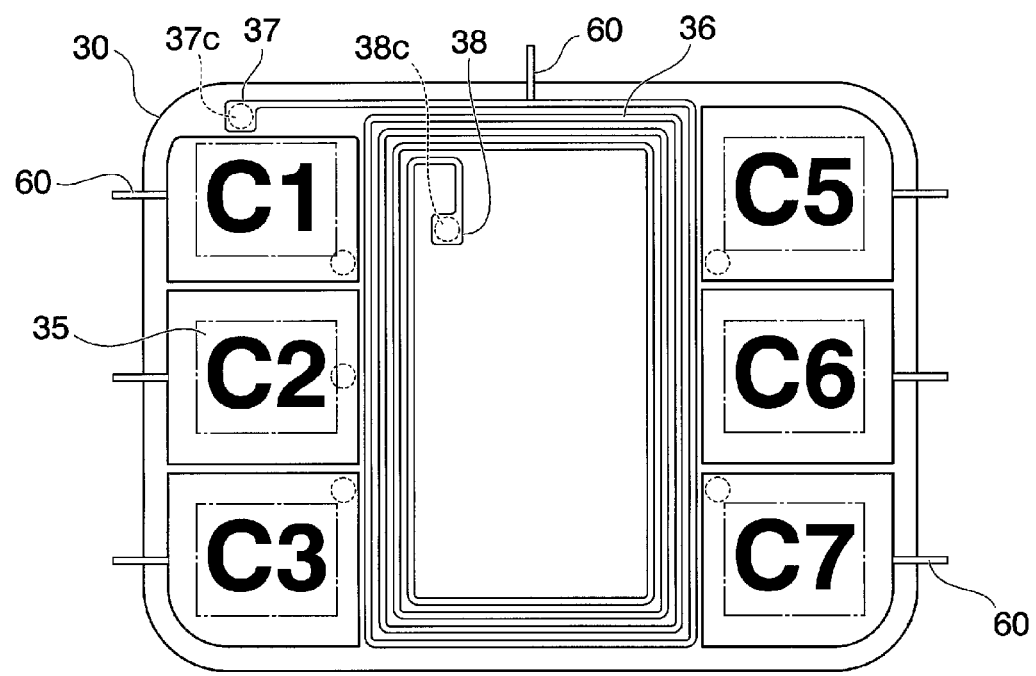
FIG. 5 is a plan view illustrating an IC module, according to another embodiment of the present invention.
Figure 6:
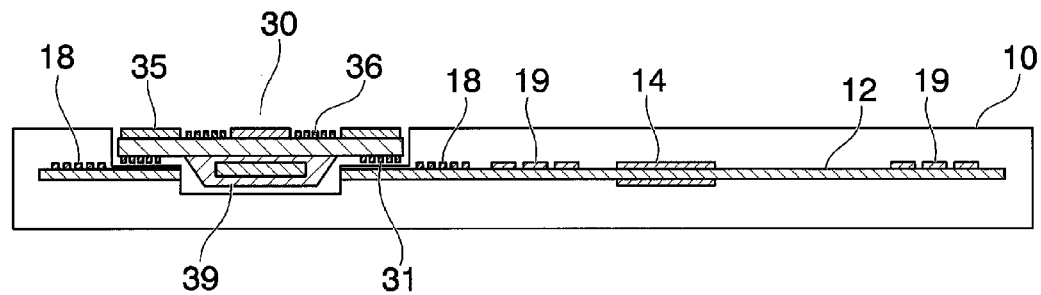
FIG. 6 is a schematic cross-sectional view illustrating an electromagnetic-coupling dual IC card, according to another embodiment of the present invention.

An embodiment of the present invention has so far been described in detail with reference to the drawings. However, specific configurations are not limited to this embodiment. The present invention should encompass modifications, combinations, or the like of this embodiment, in the range not departing from the spirit of the present invention. For example, as shown in FIG. 4, the first connecting coil 36 may be provided surrounding the plurality of contact terminals 35 (C1 to C7) provided on the first surface 33a of the module substrate 33. In this case, since the first connecting coil 36 does not overlap with the plurality of contact terminals 35, the influence of eddy current can be alleviated. As shown in FIGS. 5 and 6, the first connecting coil 36 of the IC module 30 may be looped in a space surrounded by the plurality of contact terminals 35 provided on the first surface 33a of the module substrate 33. Furthermore, the second connecting coil 31 may be provided to the second surface 33b of the module substrate 33 (omitted from FIG. 5).

Figure 7:
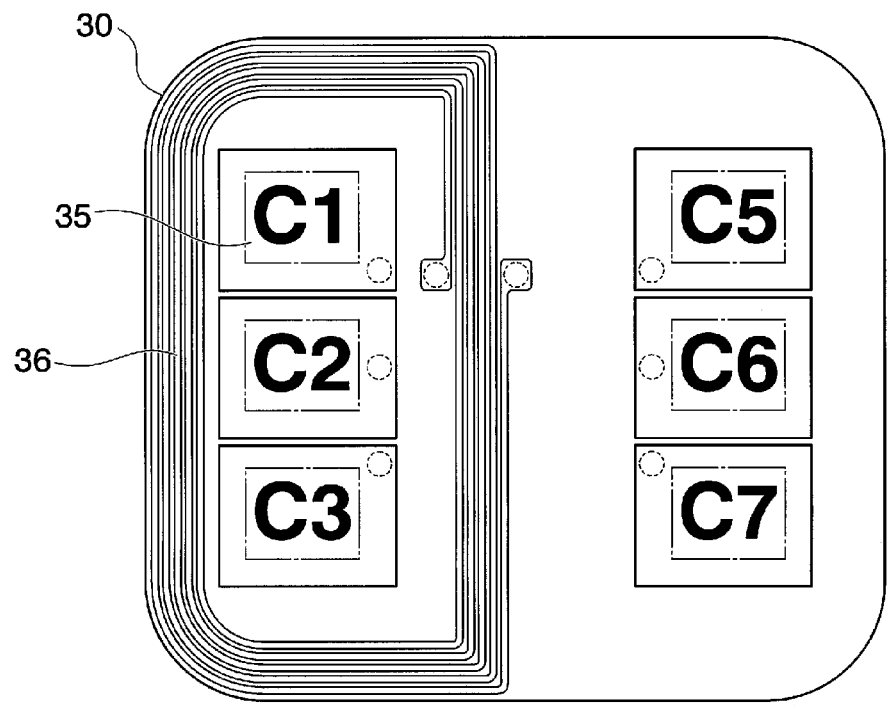
FIG. 7 is a plan view illustrating an IC module, according to another embodiment of the present invention.

As shown in FIG. 7, the first connecting coil 36 may be provided, surrounding some of the plurality of contact terminals 35 (only C1 to C3). In these cases, the connecting coil can be provided in a small space on the outside of the contact terminals, which is beneficial to miniaturization of the IC module. In particular, the IC module 30 shown in FIG. 5 can substantially dispense with the space for providing the connecting coil on the outside of the contact terminals 35, as C1 to C7, and is even more beneficial to miniaturization of the IC module.

It is preferable that there is only a small overlap, in plan view, between the second connecting coil 31 on the second surface 33b, and the contact terminals 35 on the first surface 33a. A smaller overlap can accordingly even better alleviate the influence of eddy current. From the perspective of alleviating the influence of eddy current, it is most preferable that, as shown in FIG. 1 and FIG. 8 (referred to later), neither of the first and second connecting coils 36 and 31 overlaps with the contact terminals 35 on the first surface 33a in plan view.

In the module 30 shown in FIG. 5, the plating wires 60 can be connected to the plurality of contact terminals 35, as C1 to C7, and the first connecting coil 36 on the first surface 33a, without the need of providing the plating through holes 60c. Thus, the process of connecting the plating wires 60 can be simplified.

Figure 8:
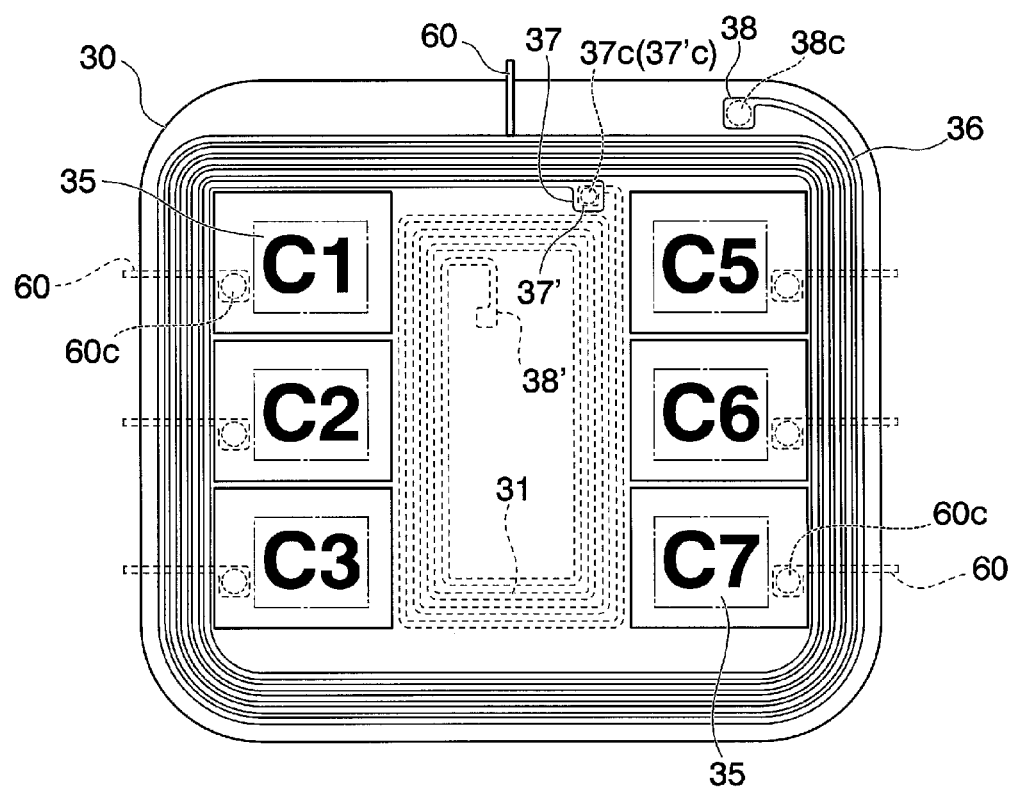
FIG. 8 is a plan view illustrating an IC module, according to another embodiment of the present invention.
Figure 9:
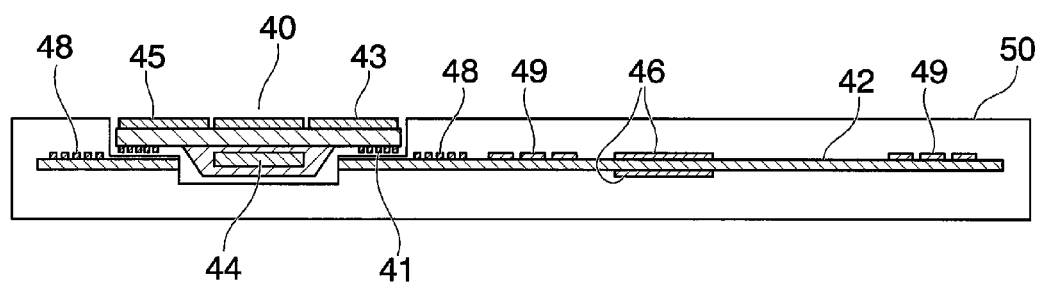
FIG. 9 is a schematic cross-sectional view illustrating an electromagnetic-coupling dual IC card based on conventional art.

As shown in FIG. 8, in plan view, the first connecting coil 36 may be provided on the first surface 33a of the module substrate 33 so as to surround the plurality of contact terminals 35, as C1 to C7, and the second connecting coil 31 may be provided on the second surface 33b of the module substrate 33 so as to be looped on the inward side of the plurality of contact terminals 35, as C1 to C7. In this example, the second and first connecting coils 31 and 36 are both disposed so as not to overlap, in plan view, with the contact terminals 35.

In this example, the second connecting coil 31 disposed on the second surface 33b has two end points 37' and 38'. The end point 37' is connected to the end point 37 of the first connecting coil 36 on the first surface 33a via the through hole 37c (37'c). The end point 38' is electrically connected to the IC chip 34. It should be noted that the plurality of contact terminals 35, as C1 to C7, and the first connecting coil 36 may be plated in the same manner as described above.

In the example shown in FIG. 8, the second connecting coil 31 may partly overlap with the IC chip 34 in plan view. In other words, the IC chip 34 may be disposed so as to partly overlap with the second connecting coil 31 disposed on the second surface 33b.

Hereinafter, a method of producing the electromagnetic-coupling dual IC card 1 will be described by way of an example.

1. Card Substrate

There is prepared a card substrate 15 made of a material, such as polyvinyl chloride (PVC) or polyethylene terephthalate copolymer (PET-G), having insulation properties or durability required of generally used card substrates.

2. IC Module

There is prepared an IC module 30 which is equipped with an IC chip 34 having both of contact and contactless communication functions, and includes contact terminals 35 used for contact communication, and connecting coils (31, 36) used for contactless communication and establishing communication with and supplying power to the coupling coil 18 of the card body 10.

The contact terminals 35 and the connecting coil 36 (31) are formed of a plurality of copper foil patterns which are formed by etching a surface of an insulating substrate made such as of glass epoxy or PET and having a thickness in the range of 50 μm to 200 μm. The copper foil patterns have exposed portions which are nickel-plated with a thickness in the range of 0.5 μm to 3 μm, and further gold-plated thereon with a thickness in the range of 0.01 μm to 0.3 μm. However, the plating configuration is not limited to this.

3. IC Chip

The IC chip 34 is adhered to glass epoxy or PET by a die attachment adhesive, and directly bonded to external connecting terminals and the connecting coils (31, 36) through gold or copper wires, each having a size in the range of ϕ10 μm to ϕ40 μm, or bonded to patterns, which are connected to the external connecting terminals and the connecting coils (31, 36), through holes opened in the glass epoxy or PET.

4. Antenna Sheet

As an antenna circuit for performing contactless communication, there is prepared an antenna sheet 12 including a main coil 19 for communicating with a reader/writer, a coupling coil 18 for transformer-coupling with the connecting coil 36 (31) of the IC module 30, and a capacitor 14. The antenna circuit is formed by patterning a material of a copper foil or an aluminum foil with a thickness in the range of 5 μm to 50 μm by etching on the front and back surfaces of an insulating base substrate such as of polyethylene terephthalate (PET) or polyethylene naphthalate (PEN) with a thickness of 15 μm to 50 μm.

5. Forming

The antenna sheet 12 is sandwiched between two card substrates 15 for lamination with hot pressing, or for adhesion processing or the like to obtain an integrated body. The integrated body is then punched into a card shape to form a card body 10.

6. Milling

The card body 10 is milled to form a recess 11 (cavity) for embedding the module 30.

7. Adhesion

The IC module 30 is mounted to the recess 11 (cavity) of the card body 10 by use of an adhesive, such as a hot melt sheet, thereby obtaining an electromagnetic-coupling dual IC card 1.

INDUSTRIAL APPLICABILITY

According to the embodiment described above, there can be provided an electromagnetic-coupling dual IC card that can reduce or prevent degradation of communication properties due to reaction magnetic flux or the like caused by eddy current which is generated by interaction of the connecting coil with the contact terminals.

REFERENCE SIGNS LIST

1 . . . Electromagnetic-coupling dual IC card; 10 . . . Card body; 11 . . . Recess; 12 . . . Antenna sheet; 13 . . . Antenna; 14 . . . Capacitor; 15 . . . Card substrate; 18 . . . Coupling coil; 19 . . . Main coil; 20 . . . Terminal; 21 . . . Connecting wire; 22 . . . Terminal; 24 . . . First holder; 25 . . . Second holder; 30 . . . IC module; 31 . . . First connecting coil; 33 . . . Module substrate; 4 . . . IC chip; 35 . . . Contact terminal; 36 . . . Second connecting coil; 37, 38 . . . End point; 39 . . . Resin seal.

What is claimed is:

1. An electromagnetic-coupling dual IC card comprising:
   an IC module that includes a module substrate having a first surface and a second surface, a plurality of contact terminals provided on the first surface of the module substrate so as to be contactable with an external contact-type device, an IC chip having a contact communication function and a contactless communication function and disposed on the second surface of the module substrate, and a first connecting coil provided on the first surface of the module substrate; and
   a card body that includes an antenna sheet and has a recess that holds the IC module, the antenna sheet comprises an antenna having (a) a coupling coil to be electromagnetically coupled to the first connecting coil, and (b) a main coil connected to the coupling coil to perform contactless communication with an external contactless-type device,
   wherein the plurality of contact terminals surround the first connecting coil on the first surface of the module substrate.

2. The electromagnetic-coupling dual IC card of claim 1, wherein the IC module further includes a second connecting coil provided on the second surface of the module substrate.

3. The electromagnetic-coupling dual IC card of claim 2, wherein the second connecting coil is disposed so as not to overlap with the contact terminals in plan view.

4. The electromagnetic-coupling dual IC card of claim 1, wherein the first connecting coil provided to the first surface is sealed with a resin.

5. The electromagnetic-coupling dual IC card of claim 1, wherein the antenna sheet, including the coupling coil and the main coil, is embedded into the card body so that the coupling coil and the main coil are surrounded by a material of the card body.

* * * * *